(12) United States Patent
Leach et al.

(10) Patent No.: US 10,368,560 B2
(45) Date of Patent: Aug. 6, 2019

(54) COLD BREWING SYSTEM

(71) Applicant: TODDY, LLC, Loveland, CO (US)

(72) Inventors: Julia Leach, Loveland, CO (US); Andrew Leach, Loveland, CO (US)

(73) Assignee: TODDY, LLC, Loveland, CO (US)

(*) Notice: Subject to any disclaimer, the term of this patent is extended or adjusted under 35 U.S.C. 154(b) by 78 days.

(21) Appl. No.: 15/630,463

(22) Filed: Jun. 22, 2017

(65) Prior Publication Data

US 2018/0125087 A1    May 10, 2018

Related U.S. Application Data

(60) Provisional application No. 62/369,540, filed on Aug. 1, 2016.

(51) Int. Cl.
*A23F 3/20* (2006.01)
*A47J 31/46* (2006.01)
(Continued)

(52) U.S. Cl.
CPC .............. *A23F 3/20* (2013.01); *A23F 3/18* (2013.01); *A23F 5/18* (2013.01); *A23F 5/26* (2013.01);
(Continued)

(58) Field of Classification Search
CPC ...... A23F 3/20; A23F 3/18; A23F 5/18; A23F 5/26; A47J 31/06; A47J 31/446; A47J 31/467
See application file for complete search history.

(56) References Cited

U.S. PATENT DOCUMENTS 1,491,730 A * 4/1924 Oldham .................. A47J 31/00
                                                        99/321
1,845,947 A * 2/1932 Weisner .................. G09C 1/08
                                                        380/58
(Continued)

FOREIGN PATENT DOCUMENTS

AU    2011100671 A4    6/2011
EP      3078307 A1    10/2016
(Continued)

OTHER PUBLICATIONS

Derwent Abstract for KR2005069413 published Jul. 2005.*
(Continued)

*Primary Examiner* — Anthony J Weier
(74) *Attorney, Agent, or Firm* — William W. Cochran; Cochran Freund & Young LLC

(57) ABSTRACT

Included is a brewing system that utilizes a curved pedestal that allows brewed effluent to drain in a manner that travels toward the center of the curved pedestal to maximize the exposure of the effluent to the organic material used for brewing, while also maximizing yield. The pedestal 112 sits above the lowest effluent level to allow the brewed effluent to drain from the organic material that is used for brewing to maximize the amount of effluent obtained. By allowing the brewed effluent to drain from the organic material, the weight and size of the organic material is reduced, so that the filter bag can be removed from the brewing system without ripping or tearing. The brewing system eliminates the need for a separate mesh bag and allows the effluent to drain without squeezing the filter bag and which would otherwise cause the release of harsh oils and acids, which can also be unsanitary as a result of a user handling the bag filter.

4 Claims, 7 Drawing Sheets

(51) Int. Cl.
*A47J 31/44* (2006.01)
*A47J 31/06* (2006.01)
*A23F 3/18* (2006.01)
*A23F 5/26* (2006.01)
*A23F 5/18* (2006.01)

(52) U.S. Cl.
CPC ............. *A47J 31/06* (2013.01); *A47J 31/446* (2013.01); *A47J 31/467* (2013.01)

(56) References Cited

U.S. PATENT DOCUMENTS

| | | | | |
|---|---|---|---|---|
| 2,645,173 | A * | 7/1953 | McWatters | A47J 31/20 99/283 |
| 3,291,033 | A * | 12/1966 | Curtis | A47J 31/007 222/385 |
| 3,502,017 | A * | 3/1970 | Karlen | A47J 31/00 99/295 |
| 4,069,751 | A | 1/1978 | Gronwick | |
| 4,105,139 | A * | 8/1978 | Scholle | B65D 1/12 222/105 |
| 6,219,871 | B1 * | 4/2001 | Frederick | D06F 17/02 68/183 |
| 8,720,321 | B2 | 5/2014 | Neace | |
| 9,629,493 | B2 | 4/2017 | Belanich et al. | |
| 10,106,393 | B1 * | 10/2018 | Russell | B67D 1/0462 |
| 2002/0083840 | A1 * | 7/2002 | Lassota | A47J 31/50 99/275 |
| 2008/0237260 | A1 * | 10/2008 | Wolek | B67D 3/0009 222/105 |
| 2012/0021108 | A1 | 1/2012 | Baumann | |
| 2012/0305595 | A1 * | 12/2012 | Braun | B67D 3/0009 222/105 |
| 2016/0270587 | A1 | 9/2016 | Yu | |
| 2016/0296062 | A1 | 10/2016 | Gross et al. | |
| 2016/0338522 | A1 | 11/2016 | Van Schyndel | |
| 2016/0353761 | A1 | 12/2016 | Paul | |
| 2017/0000289 | A1 | 1/2017 | Feber | |

FOREIGN PATENT DOCUMENTS

| | | |
|---|---|---|
| KR | 101485771 B1 | 1/2016 |
| KR | 101643327 B1 | 7/2016 |
| KR | 20150086594 A | 7/2016 |
| TW | M521429 * | 5/2016 |
| WO | 2016161024 A1 | 10/2016 |

OTHER PUBLICATIONS

Derwent Abstract for CN205152179 published Apr. 2016.*
Derwent Abstract for DE202011001184 published Apr. 2011.*
https://www.amazon.com/Zebra-Stockpots-Steamer-Insert-inches/dp/B00WNNB0ZG/ref=sr_1_2?ie=UTF87qid=1498491079&sr=8-2&keywords=zebra+stock+pot; printed from Amazon.com, Oct. 30, 2017. pp. 1-4.

* cited by examiner

COLD BREWING SYSTEM

CROSS REFERENCE TO RELATED APPLICATION

The present application claims priority to U.S. Provisional Application No. 62/369,540, as filed Aug. 1, 2016, the entire contents of which are incorporated herein by reference for all the application discloses and teaches.

BACKGROUND

Cold brewing of coffee, tea and other water-soluble organic materials has been a popular procedure. Good tasting drinks are created in this manner.

SUMMARY OF THE INVENTION

An embodiment of the present invention may therefore comprise a method of brewing a brewed effluent in a brewing system that does not produce harsh acids and harsh oils in the brewed effluent comprising: placing an organic material, used to create the brewed effluent, in a filter bag; placing the filter bag on a pedestal disposed in a bucket, the pedestal having a curved surface that is curved downwardly towards a middle portion of the pedestal so that effluent drains towards a central portion of the pedestal and the effluent is concentrated towards a middle portion of the filter bag to facilitate yield; placing water in the bucket that interacts with the organic material to create the brewed effluent; drawing the brewed effluent from the bucket to a minimum effluent level, using a faucet disposed in the bucket; providing legs on the pedestal that hold the curved surface of the pedestal above the minimum effluent level; allowing the organic material to drain for a period of time after the brewed effluent is drained to the minimum effluent level; removing the filter bag without squeezing or pushing on the filter bag to prevent the harsh oils and the harsh acids from entering the brewed effluent.

An embodiment of the present invention may further comprise a brewing system for brewing brewed effluent comprising: a bucket that holds the brewed effluent; a faucet disposed in a wall of the bucket in a location that is near a bottom portion of the bucket so that the brewed effluent can be drained to a minimum effluent level using the faucet, which leaves a space between the bottom portion of the bucket and the minimum effluent level for collection of undesirable sediment; a pedestal that has a curved surface and holes formed in the curved surface, the curved surface slanted downwardly towards a center portion of the pedestal, the curved surface having a curvature that is sufficient to allow the pedestal to not interfere with the faucet and remain above the minimum effluent level of a central portion of the curved surface; a filter bag that contains an organic material for brewing, the filter bag disposed on the curved surface of the pedestal so that the brewed effluent drains towards the central portion of the curved surface and the filter bag can fully drain, which reduces the weight of the organic material, thus making the filter bag less susceptible to tearing when being removed from the bucket.

DETAILED DESCRIPTION OF THE EMBODIMENTS

Figure 1:
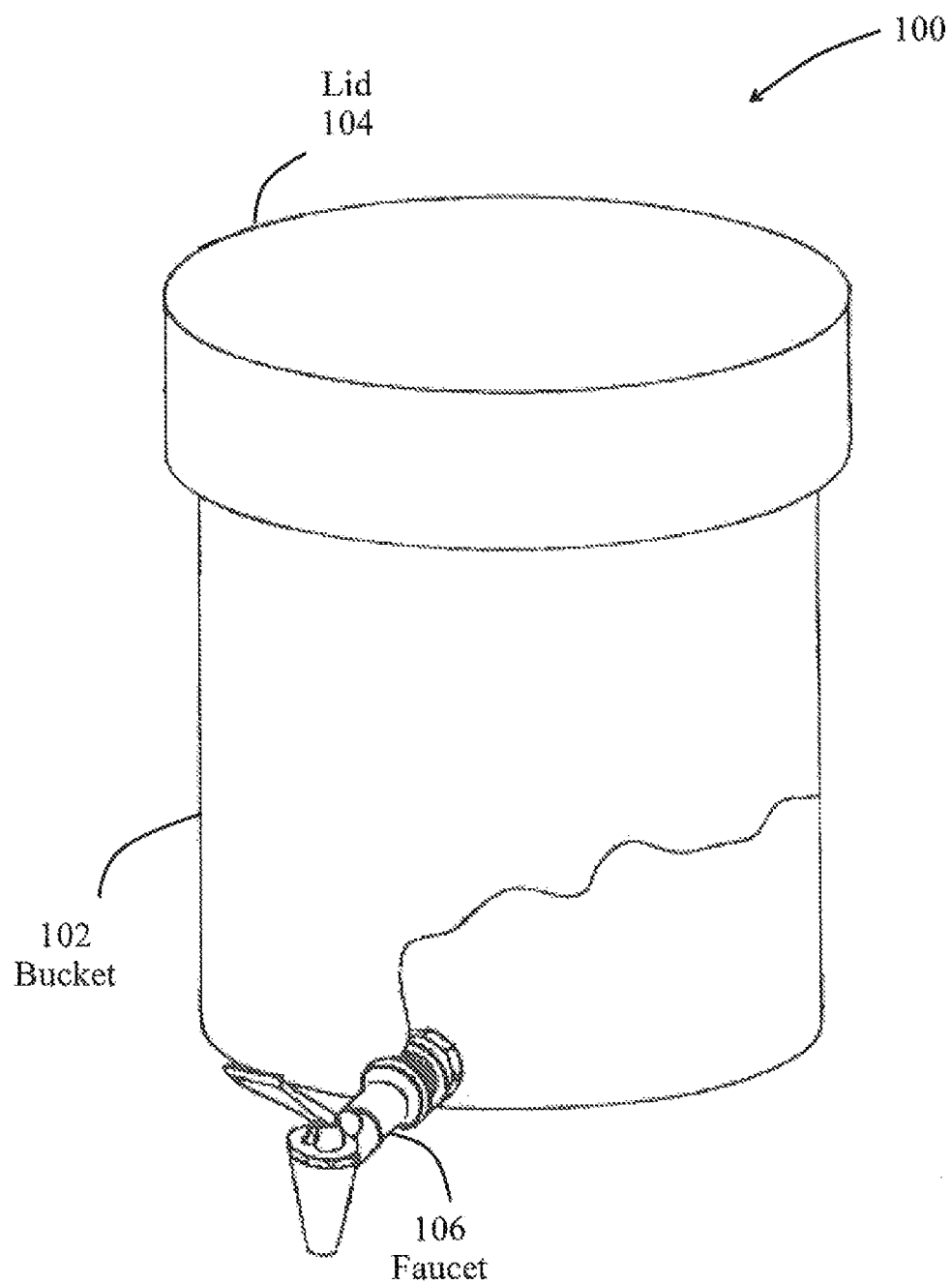
FIG. 1 is an isometric view of a cold brewing system.

FIG. 1 is an isometric view of a cold brewing system that comprises an embodiment of the present invention. As illustrated in FIG. 1, the brewing system 100 comprises a bucket 102 that has a lid 104. A faucet 106 is used to drain the brewed contents (brewed effluent) from the bucket 102. Coffee grounds, tea, or other organic material 111 is placed in the bucket 102 and room temperature water is added to the bucket. The water is allowed to remain in the bucket for a period of time to create a brewed effluent, which can be drained by the bucket 106. The cold brewing process provides for a brewed effluent 118 that has a pleasing taste, since the cold brewing process, i.e., using room temperature water, extracts the favorable flavoring from the organic materials 111. In contrast, hot brewing tends to extract many acids, harsh tannins and other harsh oils that negatively affect the taste of the brewed effluent.

Figure 2:
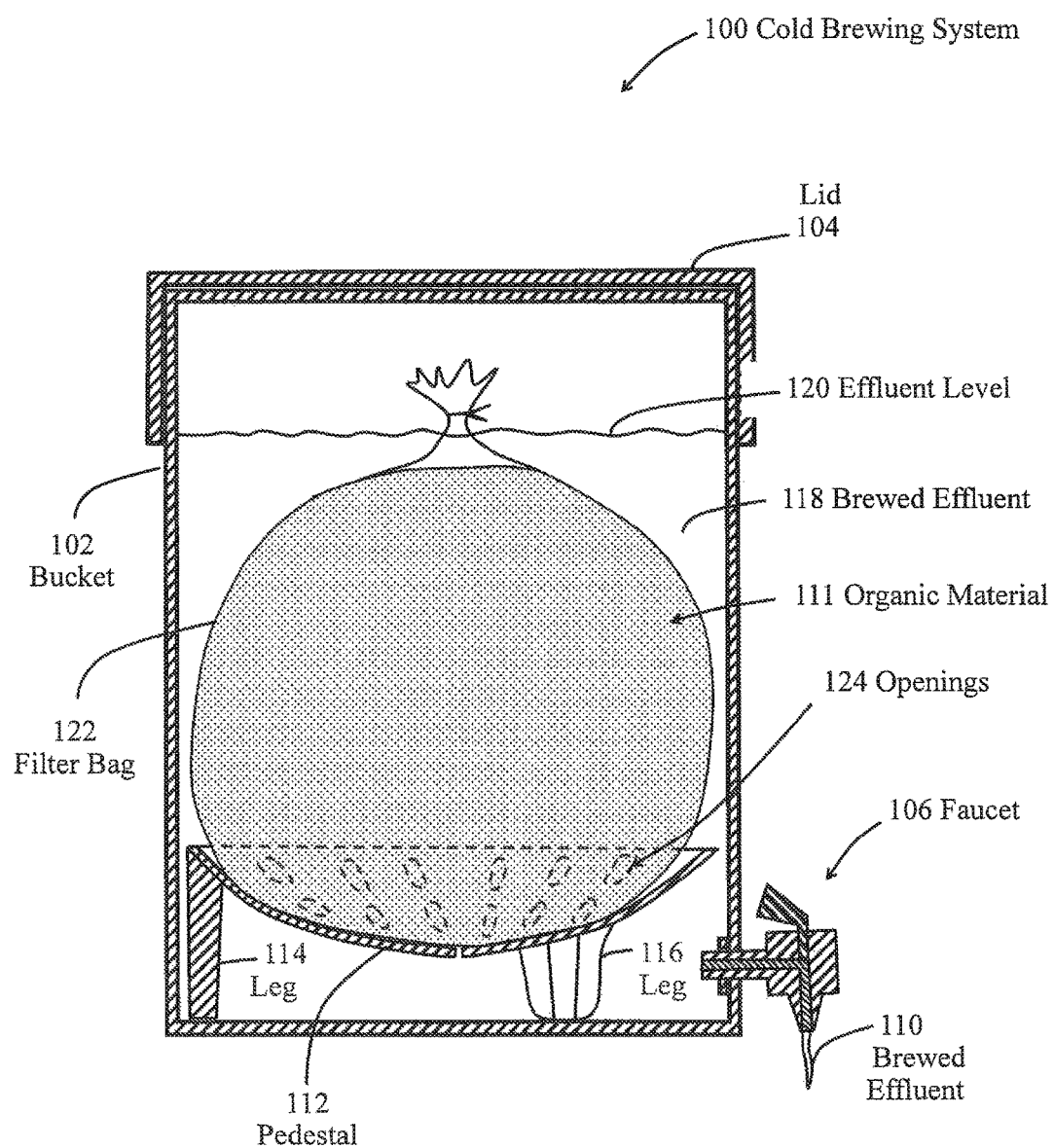
FIG. 2 is a cross-sectional view of the embodiment of FIG. 1 filled with water.
Figure 6:
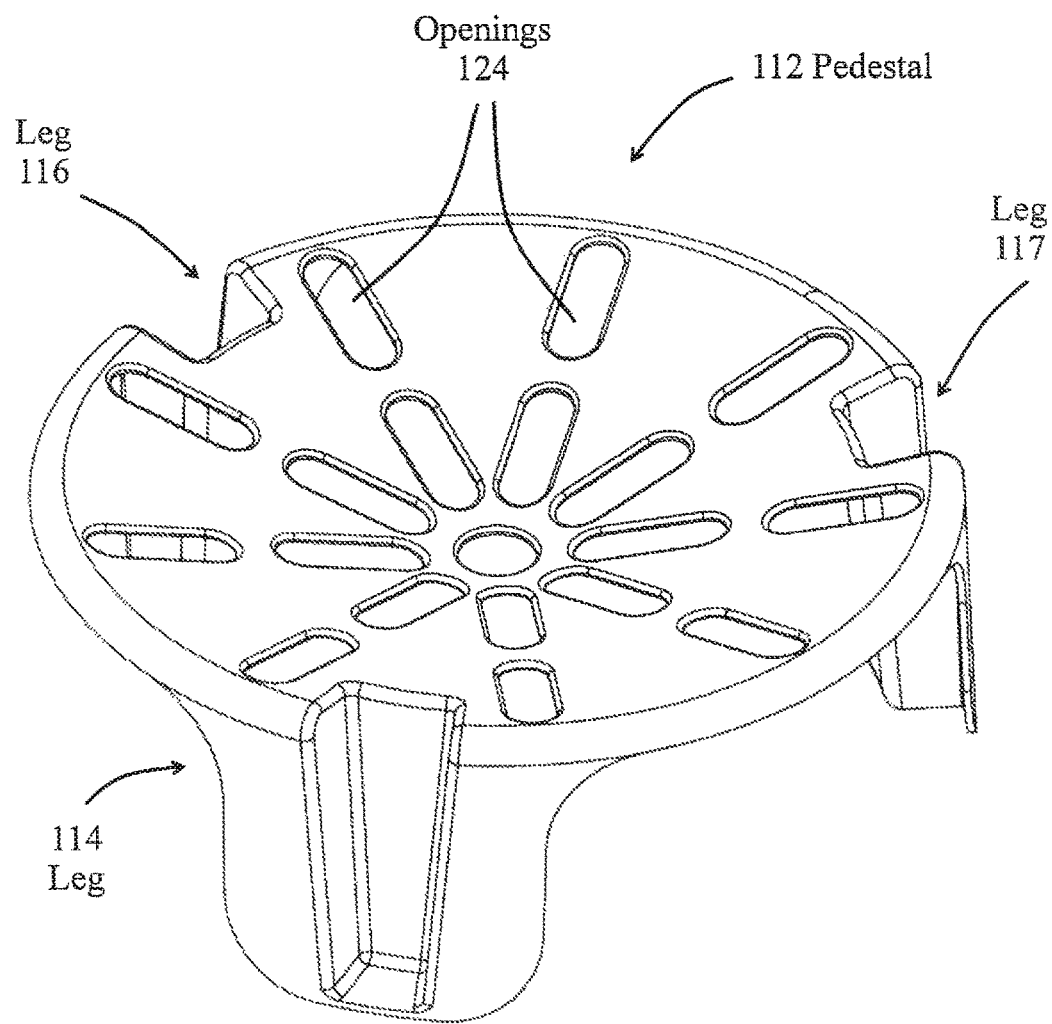
FIG. 6 is an isometric view of the pedestal of the embodiment of FIG. 1.

FIG. 2 is a sectional view of the cold brewing system 100 of FIG. 1. As illustrated in FIG. 2, the cold brewing system 100 has a bucket 102 and a lid 104. A faucet 106 is inserted through the wall of the bucket 102 to drain the brewed effluent 118, which is the product of the brewing process. A filter bag 122 is placed in the bucket 102 on a pedestal 112. In prior art devices, a separate net bag that surrounds the filter bag 122 was used for added stability to ensure that the filter bag 122 will not break when being removed from the bucket 102, as a result of the additional weight of effluent that has not been fully drained through the filter bag. Water is placed in the bucket 102 to the effluent level 120, which surrounds the filter bag 122 and the organic material 111 that is in the filter bag 122. The organic material can be any desired organic material, including ground coffee beans, tea, or other organic material that can release flavorful effluents for consumption as a beverage or for medicinal purposes. The water can be room temperature water or may vary only slightly in temperature above or more significantly below room temperature, hence "cold brewing." The water interacts with the organic material 111 and produces the brewed effluent 110. In essence, the water extracts the favorable flavorings of the organic material 111 with very few acids or harsh tannins or oils. A typical brewing process may take anywhere from several hours up to 24 hours. Filter bag 122 sits on a pedestal 112, which is curved downwardly toward the center of the pedestal 112. Pedestal 112 has a series of openings 124, which allow the filter bag 122 to sit on pedestal 112 in a curved or sloped configuration to create maximum yield. Pedestal 112 has three legs, two of which are shown as legs 114, 116 in the sectional view of FIG. 2. The third leg 117 is shown in FIG. 6. Faucet 106 is used to drain the effluent 118 from the bucket 102 and drain the brewed effluent 110 into another container after the brewing process is completed. Since the faucet 106 is capable of draining most of the effluent from the bucket, and the organic material 111 in the filter bag 122 is on the pedestal 112, and does not sit in the brewed effluent 110, it is no longer critical that the filter bag 122 does not break, since most of the effluent is drained out of the bucket when the filter bag 122 is removed from the bucket. In other words, the brewed effluent 110 is drained from the bucket before the filter bag 122 is removed. If the filter bag 122 breaks during the removal of the filter bag 122, the entire contents can simply be dumped in a trash container and very little effluent will be lost. This constitutes another advantage of using the pedestal 112 to allow the effluent 110 to be drained from the organic material 111.

Figure 3:
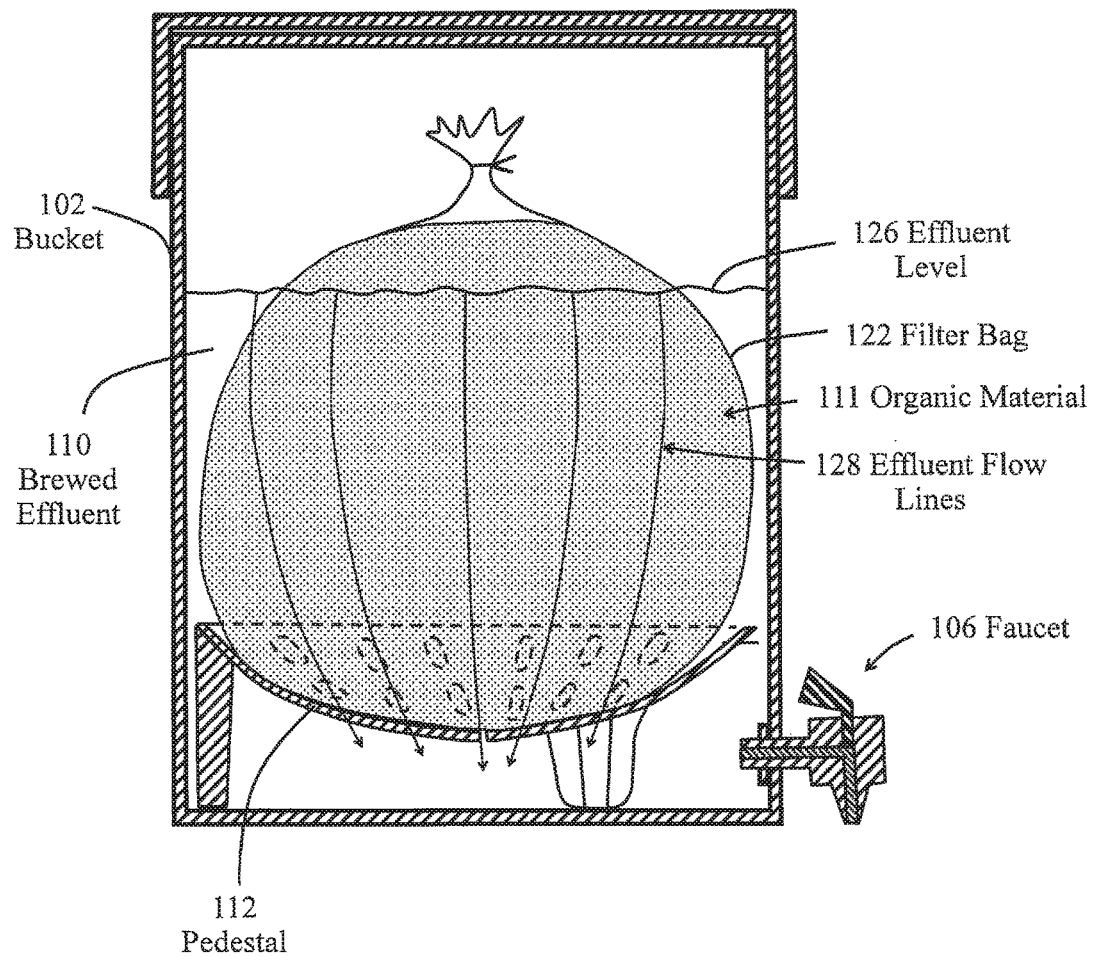
FIG. 3 is a cross-sectional view of the embodiment of FIG. 1, showing the brewing system partially filled with water.

FIG. 3 is another cross-sectional view, similar to FIG. 2, with some of the brewed effluent 110 drained from the bucket 102 using faucet 106. As illustrated in FIG. 3, the effluent flows along the effluent fill lines 128 as the effluent is drained to effluent level 126. In that regard, the brewed effluent 110 may be drained in stages. The brewed effluent 110 may be drained to the effluent level 126 and left to drain for a period of time, so that the effluent flows along the effluent flow lines 128 through a central portion of the organic material to increase the extraction of the favorable materials from the organic material 111. In that regard, the concentration of the brewed effluent 110 is increased because of the effluent flow lines 128 that pass through a central portion of the filter bag 122.

Figure 4:
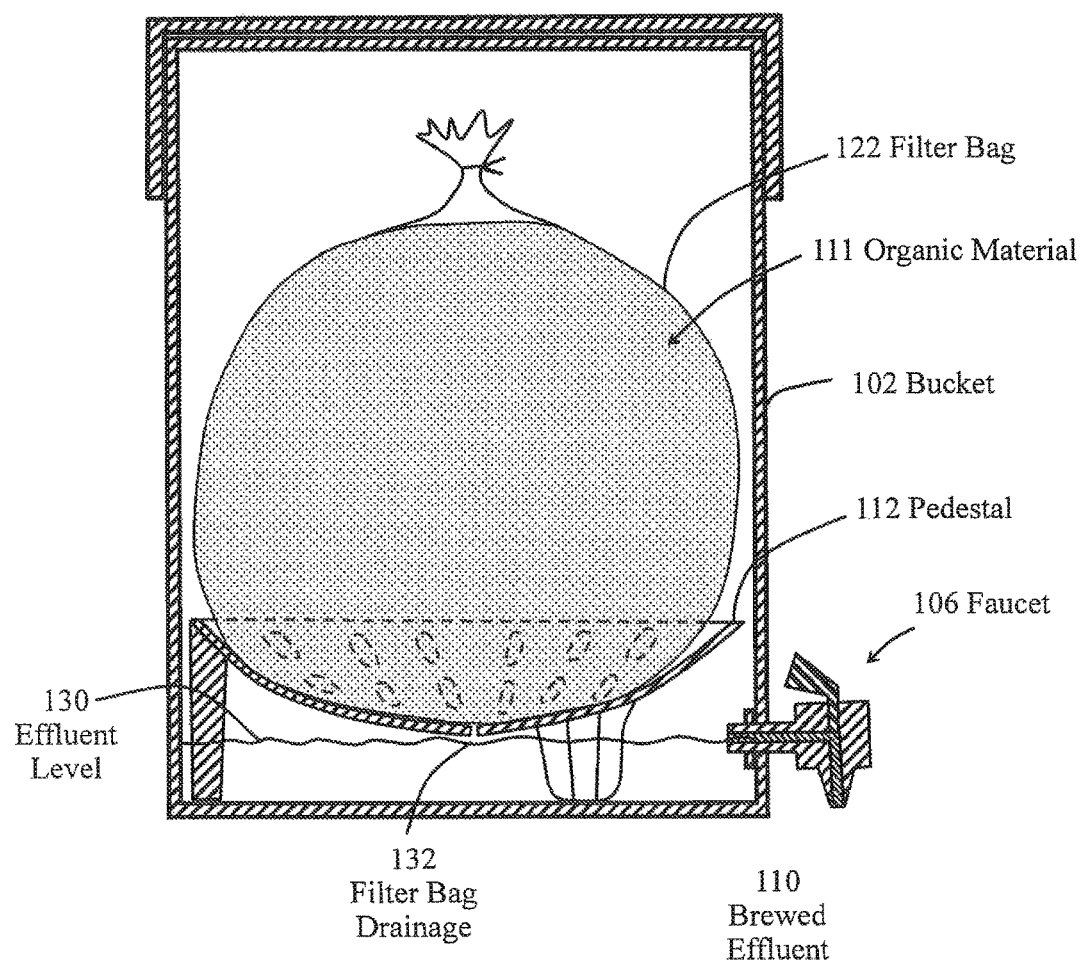
FIG. 4 is a cross-sectional view of the embodiment of FIG. 1, with the water drained to the lowest level allowed by the spigot.

FIG. 4 is a cross-sectional view of the brewing system 100 of the embodiment of FIG. 1 with the effluent 118 drained to a minimum effluent level 130, which is the lowest level to which the effluent 118 can be drained by the faucet 106. The cross-sectional view illustrated in FIG. 4 is a view directly after the effluent 118 is drained by the faucet 106. As shown in FIG. 4, the organic materials have absorbed much of the effluent 118 and remain in an expanded condition in the filter bag 122. Drainage 132 from the filter bag drains into the effluent 118 that is below the level of the faucet 106. The central bottom portion of the pedestal 112 is located above the minimum effluent level 130, which is the lowest effluent level when the brewed effluent 118 is drained by the faucet 106.

With the brewed effluent 118 at the level 130 shown in FIG. 4, the effluent that has been absorbed by the organic material 111 slowly drains from the filter bag 120 to produce the filter bag drainage 132. This causes the effluent level 130 to increase. The space in-between the bottom of the pedestal 112 and the minimum effluent level 130 is sufficient to allow the organic material 111 to drain or mostly drain from the filter bag 122. Of course, the spacing between the minimum effluent level 130 and the bottom of the pedestal 112 varies according to the size of the system 100 and the amount of organic material. Typically, the space between the bottom of the pedestal 112 and the effluent level 130 can be a half to ¾ of an inch. This space permits undesirable sediment from the organic material to collect without becoming part of the concentrate. The sediments that collect in this space between the bottom of the bucket and the lower portion of the faucet 106 are very fine sediments that are too small to be filtered out by the filter bag. As illustrated in FIG. 3, the curved shape of the pedestal 112 causes forces to be exerted on the bottom portion of the filter bag 122 in an inward direction, which causes the effluent flow lines 128 to be curved inwardly. This is a result of the inwardly directed forces on the filter bag 128 created by the curved shape of the pedestal 112, which creates pressure along the curved surface of the filter bag 122 that rests on the curved surface of the pedestal 112. The curved effluent flow lines 128, that indicate the flow of the effluent, causes the effluent to be filtered by the organic material 111 and concentrated prior to passing through the filter bag 122. As shown in FIG. 4, the effluent is drained from the organic material 111 through the filter bag 122 to the effluent level 130. Typically, very fine sediment is left in the bucket 102 in the effluent that is below the effluent level 130. This very fine sediment is not filtered by the filter bag 122 and can be considered to be undesirable by some cold coffee drinkers. Therefore, these fine sediments are left in the bottom of the bucket 102 after the filter bag 122 has drained. When the bag is removed from the bucket 102, a sufficient amount of effluent will have drained from the organic material 111, so that the chance of breakage of the filter bag 122 is low. However, if the filter bag 122 does break, the organic material 111 simply falls on the pedestal 112 and possibly into the undesirable effluent below the effluent level 130 and can be properly disposed.

Figure 5:
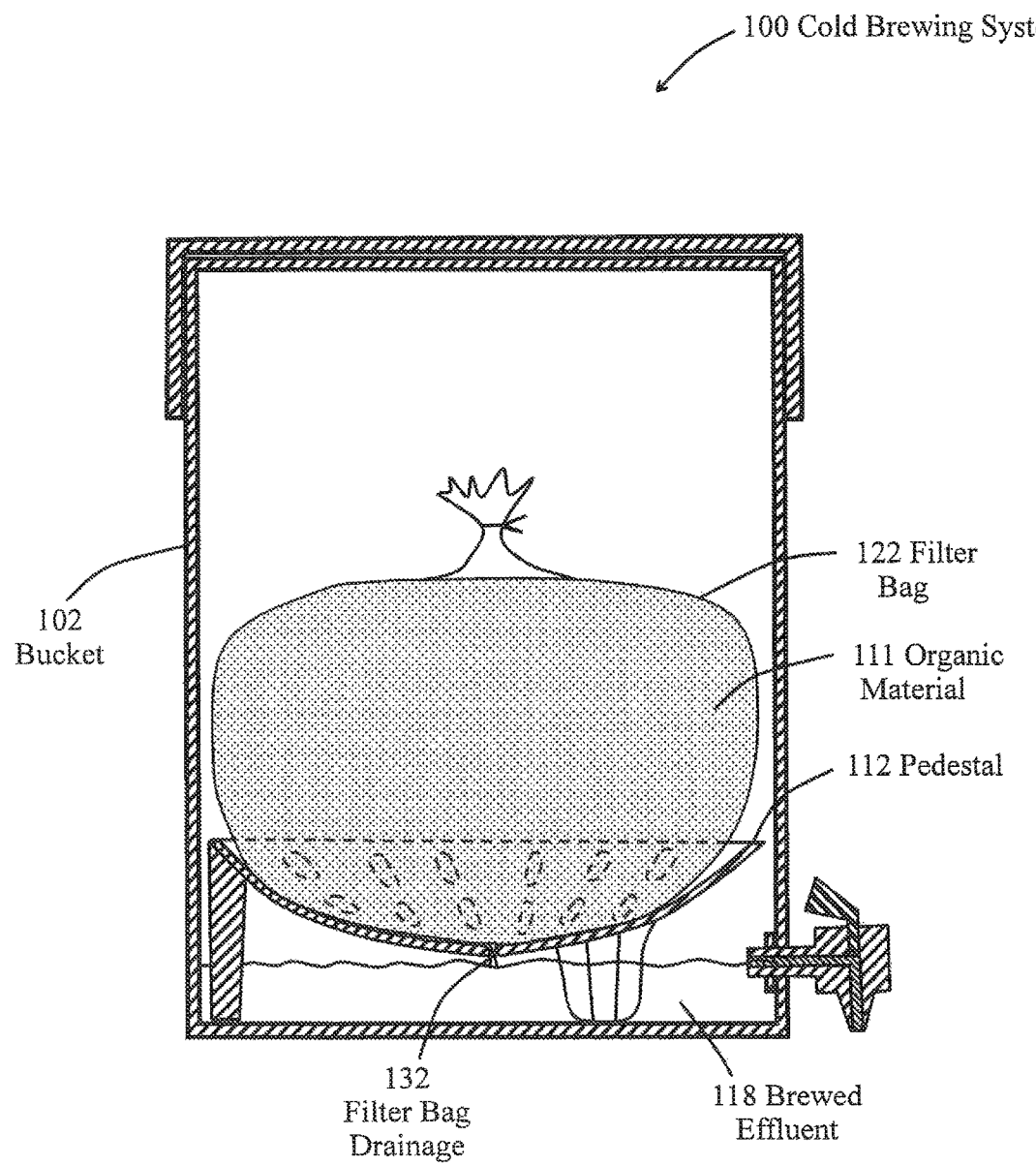
FIG. 5 is another cross-sectional view of the embodiment of FIG. 1 with most of the brewed effluent drained from the organic material.

FIG. 5 is another cross-sectional view of the brewing system 100 with most of the brewed effluent 118 drained from the organic material 111. As illustrated in FIG. 5, the filter bag 122 contains the organic material 111 that has been drained, as filter bag drainage 132, into the bottom of the bucket 102. Organic material may be allowed to drain for several minutes to several hours until most of the brewed effluent 118 is drained from the organic material 111. This process has two beneficial effects. First, the weight of the organic material 111 in the filter bag 122 is significantly reduced, which allows the filter bag 122 to be easily removed from the bucket 102 with minimal risk of tearing or ripping the filter bag 122. In previous systems, a supporting net bag was required to be used around the filter to ensure that the filter did not rip when removing the filter from the bucket 102. Additionally, a prevalent method used in prior systems was to squeeze the filter to remove the excess effluent that has been absorbed by the organic material 111. A user may typically lift the bag and squeeze it, or push down on the bag, to squeeze out excess effluent. This process would often cause the bag to tear, which would essentially ruin the effluent left in the bucket 102. Accordingly, a nylon or plastic net bag was typically used in previous systems, which added to the expense and complexity of the system. By squeezing the bag, it became easier to remove the bag, because it was lighter, and the amount of the brewed effluent was increased. What was not realized by these operators is that undesirable harsh acids, harsh tannins, and harsh oils were also squeezed from the organic material 111 and became part of the brewed effluent 118. These harsh materials degraded the taste of the resultant beverage and, in general, lowered the quality of the brewed effluent 118. In addition, the beverages generated out of the effluent constitute food grade beverages, which can be contaminated by the hands of the user, which may contain bacteria and viruses and may violate health codes. If the user attempts to lift the filter bag 122, as illustrated in FIG. 4, prior to the time that any significant amount of effluent has drained from the organic material 111, the weight of the bag will typically exceed the strength limitations of the bag, necessitating either the use of a supporting mesh bag, or requiring the user to push down on the filter bag 122 to reduce the weight. So, the process of allowing the filter to drain on its own reduces the weight of the organic material 111 in the filter bag 122, which lessens the chance of a rip or breakage of the filter bag, provides more effluent that does not contain nasty oils and acids from the organic material 111, and is more sanitary, since the user does not use his or her grubby hands to squeeze the effluent from the filter bag 122 of FIG. 5.

After filter bag 122 has been drained of brewed effluent 118, filter bag 122 then can be easily and safely picked up and removed by a single user, and there is not a large probability that the filter bag 122 will tear or rip, since the organic material 111 is significantly lighter. In addition, the user's grubby hands are not immersed in the effluent by pushing or squeezing the filter bag 122.

FIG. 6 is an isometric view of the pedestal 112. As shown in FIG. 6, there are a series of openings 124 in the curved upper surface of the pedestal that allow effluent to flow from the filter bag 122 through the pedestal 112. The pedestal 112 has three legs, legs 114, 116, 117. Each of the legs is formed with an indentation in the upper surface of the pedestal 112, which provides both strength to the legs 114, 116, 117, and creates an opening that allows a user to grasp the pedestal 112 with one or more fingers.

The curvature of the surface of the pedestal 112 causes the brewed effluent 118 to drain through the organic material 111 and funnel toward the center of the filter bag 122. See FIG. 4. As indicated above, the effluent tends to collect toward the center and flow through a greater portion of the organic material 111 to create a richer and stronger effluent, as a result of the curved surface of the pedestal 112. This process occurs without releasing any of the harsh oils and acids from the organic materials 111.

Figure 7:
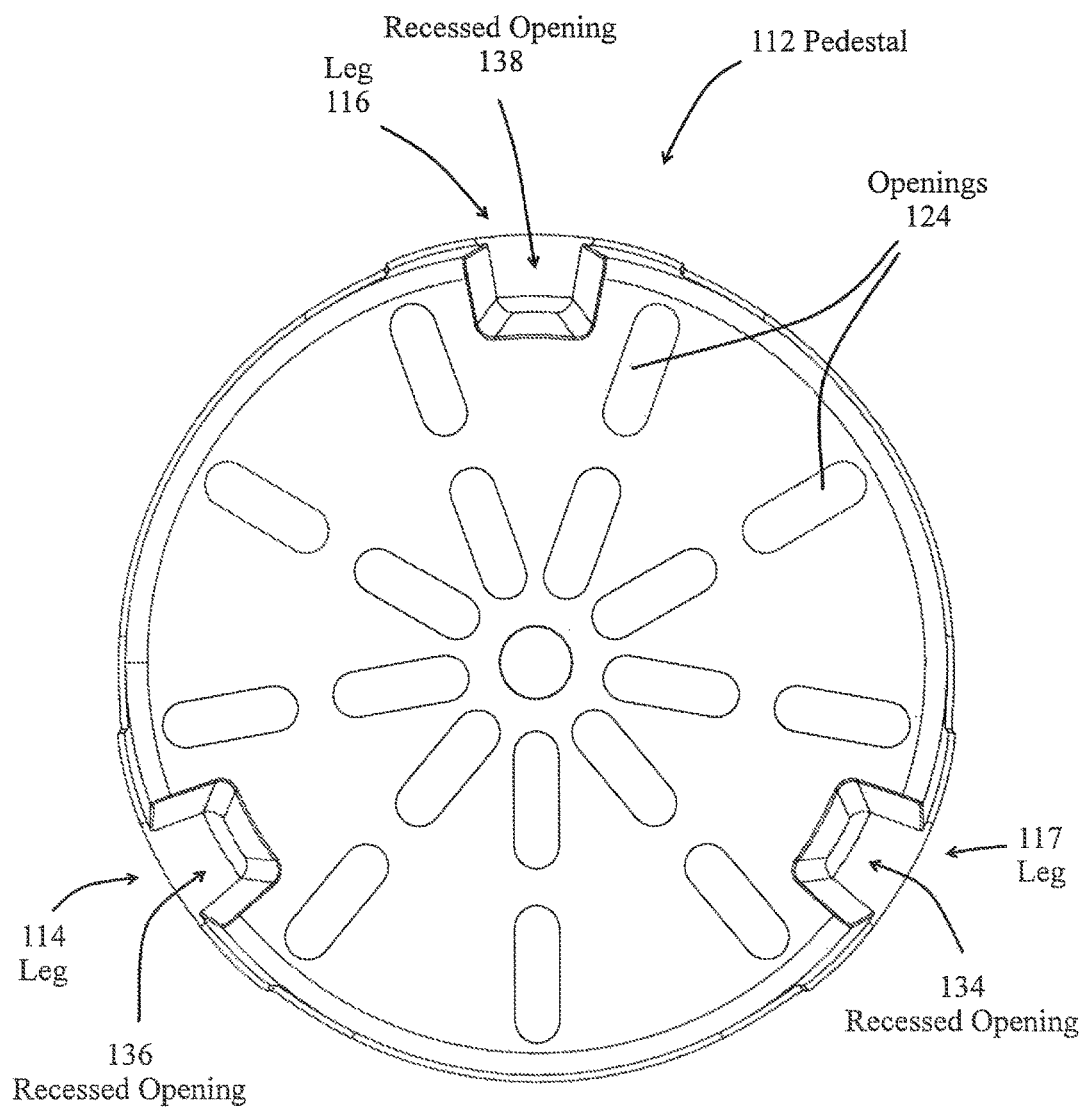
FIG. 7 is a top view of the pedestal of the embodiment of FIG. 1.

FIG. 7 is a top view of the pedestal 112. As illustrated in FIG. 7, the legs 114, 116, 117 have recessed openings 136, 138, 134, respectively. The recessed openings 134, 136, 138 are sufficiently large to allow one or more fingers to be inserted into the top surface portion of the pedestal 112 to allow the pedestal 112 to be grasped and placed in, or removed from, the bucket 102. The pedestal 112 also has a series of openings 124 and a central opening at the center of the curved portion of the pedestal 112. The curvature of the pedestal 112 also allows the pedestal 112 to be inserted in the bucket 102 and not interfere with the portions of the faucet 106 that extend through the side of the bucket 102. The curvature then allows the lower portion of the pedestal to drain to a level that is just above the effluent level 130, as shown in FIG. 4. The openings 124 can be of any desired size or shape to allow the effluent 118 from the organic material 111 to pass through the pedestal to the bottom portion of the bucket 102. The pedestal 112 may be fabricated from any desired material, including a food grade plastic material that can be easily and inexpensively produced. The material should be a food grade quality with a specific gravity of greater than 1.0 that causes the pedestal 112 to not float. In this manner, when the pedestal 112 is placed in the bucket 102, with water in the bucket, the pedestal will sink to the bottom and become firmly seated by legs 114, 116, 117 on the bottom of the bucket 102.

The foregoing description of the invention has been presented for purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A brewing system for brewing brewed effluent comprising:
    a bucket that holds said brewed effluent;
    a faucet disposed in a wall of said bucket in a location that is near a bottom portion of said bucket so that said brewed effluent can be drained to a minimum effluent level using said faucet, which leaves a space between said bottom portion of said bucket and said minimum effluent level for collection of undesirable sediment;
    a pedestal that has a curved surface and holes formed in said curved surface, said curved surface slanted downwardly towards a center portion of said pedestal, said curved surface having a curvature that is sufficient to allow said pedestal to not interfere with said faucet and remain above said minimum effluent level of a central portion of said curved surface;
    a filter bag that contains an organic material for brewing, said filter bag disposed on said curved surface of said pedestal so that said brewed effluent drains towards said central portion of said curved surface and said filter bag can fully drain, which reduces the weight of said organic material, so that said filter bag does not tear when being removed from said bucket.

2. The system of claim 1 wherein said filter bag is constructed of a paper filter and there is no net bag surrounding said filter bag.

3. The system of claim 2 wherein said pedestal is a food grade material and does not float.

4. The system of claim 3 wherein said pedestal has at least three legs that form recessed openings at locations where said legs meet said curved surface, said recesses being sufficiently large to allow a user to insert a finger for removal of said pedestal from said bucket.

* * * * *